United States Patent [19]

Dils

[11] Patent Number: 4,576,486
[45] Date of Patent: Mar. 18, 1986

[54] OPTICAL FIBER THERMOMETER
[75] Inventor: Ray R. Dils, Vancouver, Wash.
[73] Assignee: The United States of America as represented by the Secretary of Commerce, Washington, D.C.
[21] Appl. No.: 525,771
[22] Filed: Aug. 23, 1983
[51] Int. Cl.[4] .............................. G01J 5/08; G01J 9/00
[52] U.S. Cl. .................................... 374/131; 250/339; 374/129; 374/141
[58] Field of Search ............... 374/130, 131, 161, 129; 250/225, 339, 342; 350/96.1, 96.2

[56] References Cited

U.S. PATENT DOCUMENTS

| | | | |
|---|---|---|---|
| 3,051,035 | 8/1962 | Root | 374/131 |
| 3,091,693 | 5/1963 | Rudomanski et al. | 374/129 X |
| 3,105,150 | 9/1963 | Duke | 374/131 X |
| 3,433,052 | 3/1969 | Maley | 374/129 X |
| 3,570,277 | 3/1971 | Dorr et al. | 374/131 |
| 3,626,758 | 12/1971 | Stewart et al. | 374/131 X |
| 3,745,834 | 7/1973 | Veltze et al. | 374/131 |
| 4,220,857 | 9/1980 | Bright | 250/339 |
| 4,313,344 | 2/1982 | Brogardh et al. | 374/131 X |
| 4,437,772 | 3/1984 | Samulski | 374/131 X |
| 4,459,642 | 7/1984 | Mori | 350/96.2 X |
| 4,468,771 | 8/1984 | Zhukov et al. | 374/131 |

OTHER PUBLICATIONS

"Remote Optical Temperature Measurement Using Luminescent Materials" J. S. McCormack 7/22/81, pp. 57–58 and 55, NASA Tech. Briefs 8/1981.

Primary Examiner—Daniel M. Yasich
Attorney, Agent, or Firm—Eugene J. Pawlikowski; Alvin J. Englert; David A. Blumenthal

[57] ABSTRACT

A temperature measuring device suitable for high temperature measurements in the range of 500°–2400° C. utilizing a blackbody cavity to emit radiation in the wavelength band of 0.3 μm–1.0 μm. The emitted light is transmitted to a photodetector via a high temperature ceramic fiber which is transparent to the wavelength band radiated. The radiance of the cavity is utilized as a measure of its temperature.

17 Claims, 8 Drawing Figures

OPTICAL FIBER THERMOMETER

BACKGROUND OF THE INVENTION

This invention relates generally to temperature measurement apparatus, and more specifically to relatively high temperature measurements extending to approximately 2400° C.

The accurate measurement of high temperatures has always been and is a major industrial problem. Severe operating environments limit the use of standard temperature measuring techniques; conventional materials and design constraints limit both the maximum operating temperature and their use in chemically aggressive environments. The invention is directed toward a measuring technique which can improve upon existing techniques, such as thermocouples, resistance thermometers and pyrometers, or provide a new measurement capability in regimes where conventional techniques do not operate. The temperature measuring device may find application in a large number of environments, basically wherever it is desirable to take temperature measurements either for monitoring the temperature quantity per se, or for control purposes, such as, for example, in industrial facilities.

The invention utilizes a blackbody cavity formed on the tip of a light transmitting fiber. The blackbody cavity serves as a signal generator which emits blackbody radiation whose amplitude and frequency spectra are indicative of the blackbody cavity temperature. Radiation from the blackbody cavity is transmitted via the light transmitting fiber to an optical receiving device which converts the received radiation into an electrical signal having a signal characteristic indicative of the magnitude of received radiation. The basic technique set forth above has been described in U.S. Pat. No. 3,626,758 incorporated herein by reference.

SUMMARY OF THE INVENTION

It is an object of the invention to improve upon the prior art and to provide a highly accurate temperature measuring device using a blackbody cavity emitter.

It is a further object of the invention to provide an accurate temperature measuring device for temperatures within the range of 500° C.-2400° C. using a blackbody cavity radiator.

Another object of the invention is to provide a temperature measuring device capable of efficiently transmitting blackbody radiation in the band of 0.3 $\mu$m-1.0 $\mu$m (micrometers) over an optical link or fiber which does not emit or absorb radiation in the radiation band over a temperature range within 500°-2400° C.

A further object of the invention is to provide a temperature measuring device which uses a high temperature optical fiber having an optically dense solid oxide tip to enable blackbody radiation measurements.

Yet another object of the invention is to provide a temperature measuring device having suitable chemical and mechanical durability for use in oxidizing environments having high temperature ranges on the order of 500° C.-2400° C.

The invention may be characterized as a temperature measuring device comprising an elongated optical fiber, a blackbody cavity, a high temperature fiber and a light detector. The blackbody cavity is positioned at one end of the high temperature fiber and both the blackbody cavity and the high temperature fiber are able to withstand temperatures in the range of 500°-2400° C. The blackbody cavity emits radiation in the range of 0.3 $\mu$m-1.0 $\mu$m within said temperature range of 500°-2400° C. The high temperature fiber transmits radiation in the temperature range of interest without substantial absorption or re-emittance thereof. The light detector is coupled to receive light transmitted by the high temperature fiber and includes a narrowband filter for selecting a narrow optical band within said 0.3 $\mu$m-1.0 $\mu$m range. The light detector provides an output signal which is proportional to the intensity of the received and filtered light. The temperature measuring device may also include an output device responsive to the output signal from the light detector to provide an indication of the temperature measurement.

Several distinct advantages result from utilizing the blackbody cavity radiator in accordance with the invention. When used as a temperature standard, a thermometer using a sapphire high temperature optical fiber will permit temperature measurements to approximately 2000° C.—an increase of 500° C. above the maximum operating temperature of the present day thermocouple standard. The invention may also be up to about 40 times more accurate than the existing standard. In contrast to the present thermocouple standards that are based on calibration and interpolation between fixed points, the optical fiber thermometer is based on fundamental radiation laws, and may be used to measure thermodynamic temperatures directly.

In industrial gas streams, for example, the optical fiber thermometer responds faster than conventional measurement techniques. The device also has lower heat transfer losses and therefore can measure temperatures at lower gas stream velocities. The invention is thus useful for measurement and control of high temperatures in gas turbines and internal combustion engines, as well as in chemical processes.

Measurements made using the inventive device are free from the interference effects caused by strong nuclear and electromagnetic radiation fields. Therefore, the optical fiber thermometer is also applicable in power generation equipment, nuclear energy systems, weapons, space applications and similar areas. Moreover, the temperature measuring device is chemically stable in many environments and can directly measure liquid and solid temperatures with superior spatial resolution and temporal response and low drift. Accordingly, the device is applicable in the primary metals and chemical processing industries.

In accordance with the invention, a blackbody cavity is formed on the tip of a thin single crystal aluminum oxide (sapphire) or zirconium oxide (zirconia) high temperature fiber, and the radiance emitted at a single wavelength from the cavity is used to measure its temperature. A high temperature fiber and, an optional additional low temperature fiber, transmit the signal to a conventional optical detector.

A thermometer in accordance with the invention consists of three basic elements, the signal generator, one or more transmitting optical fibers, and the optical detector. The signal generator at the tip of the high temperature fiber is selected to be an effective blackbody radiator. A simple blackbody cavity can be created by sputtering a thin optically dense metallic or oxide coating on the surface of the fiber. The apparent emittance of the cavity is not a strong function of temperature, even for relatively small length to diameter ratios. The equations describing the radiant emission from such a cavity are well known. Therefore, the device can be calibrated at a single temperature and the fundamental radiation laws can be used to extrapolate to other temperatures.

The second element of the thermometer consists of a high temperature optical fiber which transmits the signal to the detector. A low temperature fiber is also advantageously employed in many applications, especially where it is desired to locate the sensor relatively far away from the blackbody cavity. In most engineering applications, it is only required that the transmission losses be reproducible to 1% and not be a function of temperature. The high temperature fibers (aluminum oxide or zirconium oxide) are selected for their high temperature stability and ability to transmit optical wavelengths from 0.3 μm to 1.0 μm at high temperatures. The coupling losses due to reflection and misalignment between the high and low temperature fibers are not a function of temperature. Transmission losses due to absorption in the low temperature fiber may be made negligible if the fiber is cooled during operation and if its length is not too long such as less than 100 m.

The third element of the thermometer is the detector system which can be constructed from a wide range of conventional components. The principle components are a light gathering lens, a narrowband filter, and a photomultiplier or silicon detector. Either one or more narrowband filters can be used. A single narrowband filter with the band centered at wavelengths between 0.3 μm and 1.0 μm may be used during normal high temperature (500° C.–2400° C.) operation. The wavelengths between 0.3 μm and 1.0 μm are chosen to obtain a maximum sensitivity and to minimize high temperature optical absorption in the high temperature fiber. The device can be self-calibrated by measuring two wavelengths at two different temperatures. Standard photometric practices can maintain 1% a level of uncertainty, while advanced techniques can measure light intensity to better than 0.1%; the respective uncertainties in temperature measurement are 0.05% and 0.005%.

BRIEF DESCRIPTION OF THE DRAWINGS

The invention is described by reference to the following detailed description taken in conjunction with the accompanying drawings, wherein:

FIG. 1a is a schematic diagram of the complete optical fiber thermometer;

FIG. 1b is an enlarged view of the blackbody cavity 12 of FIG. 1a;

DETAILED DESCRIPTION OF THE PREFERRED EMBODIMENTS

Device Configuration

Figures 1A, 1B:
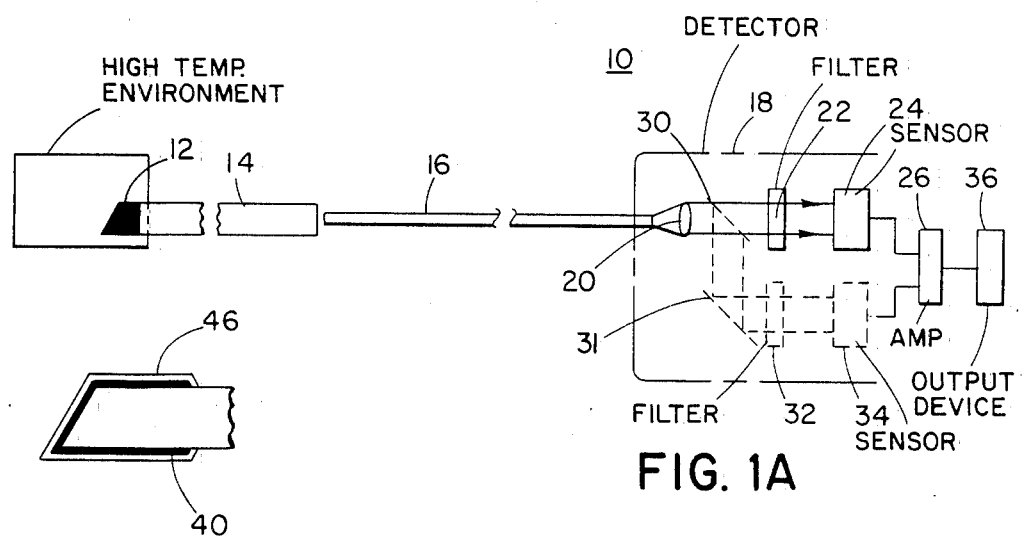

As illustrated in FIGS. 1a and 1b, the optical fiber thermometer 10 in accordance with the invention comprises a signal generator in the form of a blackbody cavity 12 positioned at the tip of a high temperature optical fiber 14. The high temperature fiber 14 is shown coupled to a low temperature optical fiber 16 which in turn is coupled to a detector 18. Detector 18 may comprise a lens 20, narrowband optical filter 22, optical sensor 24 and amplifier 26.

The optical sensor 24 may be selected from numerous known devices so as to have a high sensitivity to the particular wavelength and temperature range desired to be measured. The detector 18 may also comprise a beam splitter 30, mirror 31, additional narrowband optical filter 32, and additional optical sensor 34. The additional filter and sensor are used for calibration purposes or to provide additional temperature ranges of high sensitivity. A neutral density filter may also be incorporated into the optical path ahead of sensors 24 or 34.

Once the transmission detector efficiency of the thermometer is known, the device can be self-calibrated by measuring the radiance at two wavelengths at any two unknown but different temperatures. For example, at 1000° C., using 0.6 μm and 0.7 μm wavelengths and maintaining a 0.1% photometric error, the accuracy of the self-calibration will be ~5×10⁻²%.

The outputs of the optical sensors 24 and 34 are fed to an output device 36 which provides a visual readout of the temperature dependent upon the magnitude of the sensor output signals. The output device may be a digital voltmeter for example.

The signal generator at the tip of the high temperature fiber is fabricated to be an effective blackbody radiator. Typically, cavities with length to diameter (L/D) ratios of 1/1 to 20/1 are preferred. The equations describing the radiant emission from such a cavity are well known. The Planck equation describing the spectral distribution of radiance for an ideal blackbody is used in conjunction with the Gouffe equation describing the apparent emittance of a cavity of finite dimensions and isotropically diffuse reflecting walls in order to determine the radiance at the exit of the cavity. The flux entering the fiber is obtained by integrating the internally reflected flux from the critical angle to the axis of the fiber. The total radiance entering the fiber is simply $$L(\lambda_o) = \frac{a \epsilon_o C_1}{\lambda_o^5 [\exp(C_2/\lambda T - 1)]} \quad [W/m] \quad (1)$$

where
a = area of the cavity exit, m²
$\epsilon_o$ = apparent emittance of the cavity
$C_1$ = first radiation constant, 3.741832×10⁻¹⁶ W·m²
$C_2$ = second radiation constant, 1.438786×10⁻² m K
$\lambda_o$ = wavelength in vacuum, m (meters).

$\lambda_o$ is selected to provide a maximum sensitivity to temperature changes with a measurable radiance and low absorption in the high temperature fiber at elevated temperatures. To obtain maximum sensitivity it is desired to use the short wavelength side of the blackbody radiation curve. From 600° C. to 1300° C., a 0.1 μm wide band centered between 0.6 μm–0.7 μm is desirable. In a preferred example at 1000° C. and 0.6 μm, a 0.25 mm diameter cavity will emit ~$10^{-7}$ watts of optical power in a 0.1 μm bandwidth and a 1% change in temperature will cause a 20% change in radiance. In another preferred example above 1300° C., a 0.1 μm wide band centered 0.4 μm–0.5 μm will provide similar sensitivity and radiance.

Blackbody Cavity Materials and Design

Figure 2A:
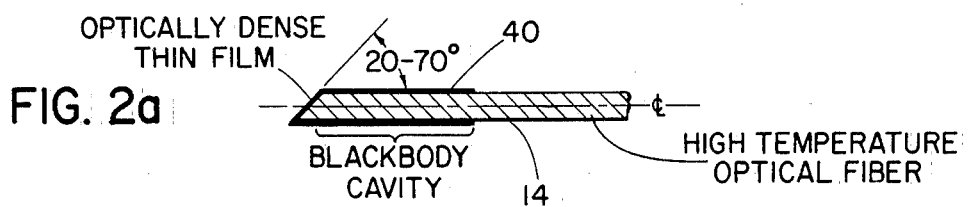
FIG. 2a is a partial cross-sectional view of a simple blackbody cavity formed by a single optically dense thin film sputtered on a high temperature optical fiber.

The blackbody cavity 12 is composed by sputtering one or more opaque films onto the fiber 14 to form blackbody cavity dimensions with an L/D ratio from 1/1 to 20/1. In FIG. 2a, a thin, optically dense (opaque) film 40 is sputtered directly on the high temperature fiber 14. The end of the fiber is formed at an angle of 20°–70° from the axis to increase light scattering of the light within the cavity. Sputtered film thicknesses preferably include 0.2 μm to 10 μm. The optically dense film 40 can be a noble metal film, such as platinum or iridium, depending on the maximum operating temperature of the thermometer. For example, a platinum film will operate to temperatures of 1760° F., and an iridium film will operate to temperatures of 2370° F.

The optically dense film 40 may alternatively comprise an optically dense oxide film to form the blackbody cavity on the tip of the high temperature fiber. As in the case of the noble metal films, the oxide film must be compatible with the high temperature fiber and stable at high temperatures. Aluminum oxide doped with several percent of chromium (from 0.1 to 20% and preferably about 10%) is an example of such an optically dense oxide film for use with sapphire high temperature fibers.

Figure 2B:
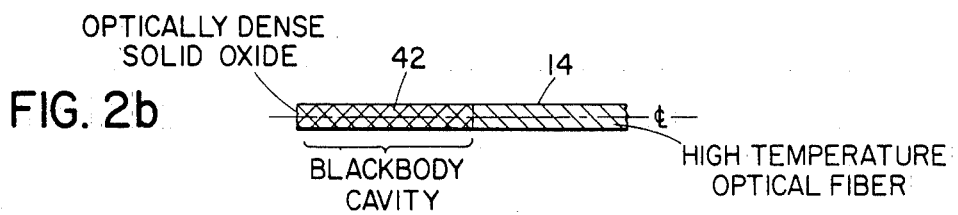
FIG. 2b is a cross-sectional view of a blackbody cavity formed by a solid optically dense tip on the end of a high temperature optical fiber.

In another preferred embodiment of the invention as shown in FIG. 2b, the blackbody cavity is formed from a solid optically dense tip 42 coupled to the end of the fiber 14. In this case, the emissivity of the cavity approaches one and becomes independent of temperature when the absorption length is large with regard to the wavelength, but smaller than the cavity length. Preferred cavity lengths are from 0.25 mm to 25 mm, inclusive. The optical absorption coefficient of the oxide can be adjusted through impurity doping, and a chromium doped aluminum oxide is a preferred oxide tip for a sapphire oxide fiber. The oxide tip may be fabricated separately and then bonded to the end of the high temperature fiber. Chromium may be doped in the amount of 0.1–20% and preferably about 10% by weight.

Figure 2C:
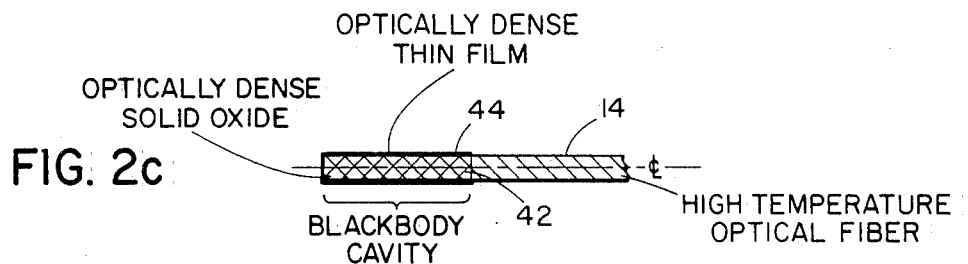
FIG. 2c is a cross-sectional view of a blackbody cavity formed by a solid optically dense tip and an optically dense thin film.

In a most preferred embodiment shown in FIG. 2c, the solid optically dense oxide tip 42 has a thin film 44 sputtered thereon to form an effective blackbody cavity on the end of the high temperature fiber 14. The sputtered film 44 may be a noble metal, for example platinum or iridium, which is optically dense.

Figure 2D:
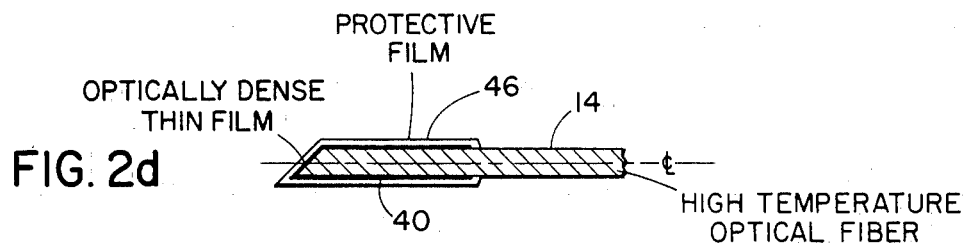
FIG. 2d is a cross-sectional view of the blackbody cavity of FIG. 1 overcoated with a protective layer.
Figure 2E:
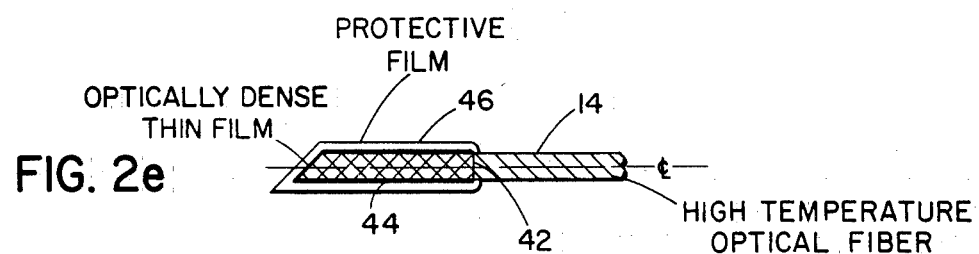
FIG. 2e is a cross-sectional view of the blackbody cavity of FIG. 2c overcoated with a protective layer.

The stability of the thin film 40 of the blackbody cavity is improved by overcoating the optically dense film with a protective film 46 as shown in FIGS. 1 and 2d. In the case of a sapphire fiber, the protective film is aluminum oxide; for a zirconia fiber, a zirconia (or yttria or calcia stabilized zirconia) thin film is applied to reduce the rate of degradation of the original film. In both instances, the films are sputtered from 1 μm to 20 μm thick. As shown in FIG. 2e, a similarly fabricated film 46 may be applied to the embodiment of FIG. 2c to provide a protective layer for the optically dense film 44.

High Temperature Optical Fiber

The high temperature optical fiber 14 is an important element of the thermometer design which accomplishes several functions. The primary function of the fiber is to collect and transmit the light from the blackbody cavity 12 to the light detector 18. This transmission may take place directly or via the low temperature optical fiber 16. Accordingly, the high temperature optical fiber 14 must be stable at high temperatures in order to maintain mechanical integrity and an optically smooth surface. In most applications, the fiber must be chemically stable in the presence of a high temperature oxidizing environment. Commonly used optical glass (silica) fibers are not suitable since they start to melt at relatively low temperatures, e.g., 1000°–1200° C. Moreover, the surrounding plastic protective coatings in standard voice/data optical fibers have a low melting point of about 200° C. A further prohibiting characteristic of glass fibers is that they begin to absorb light at about 700° C.

In accordance with the invention, the fiber 14 must neither absorb nor re-emit light within the 0.3 μm to 1 μm band at the operating temperatures, nor should such light be scattered off its surface. The high temperature fiber of the invention must be able to transmit light within 0.3 μm to 1.0 μm bandwidth above 500° C. Ceramic fibers, in particular single crystal aluminum oxide fibers, have been found to have the desired properties and are thus suitable for use in the invention.

The high temperature fiber 14 is grown or worked to a cylindrical shape with typical length to diameter ratios of 10/1 to 1000/1, with an optically smooth surface. The actual length to diameter ratios are determined by the heat transfer to the thermometer and the required accuracy. Generally, as the rate of heat transfer from the environment to the thermometer decreases, larger length to diameter ratios are required. More accurate devices also require larger length to diameter ratios.

The practical diameter range of the high temperature fiber 14 is 0.025 mm to 2.5 mm (millimeters), with the preferred ranges from 0.125 mm to 1.25 mm. Generally, the diameter of the fiber will be decreased when greater spatial resolution or superior thermal shock resistance is required. The optical signal is usually attenuated in the optical detector 24 for fibers with diameters larger than 1.25 mm, and thus, larger fibers are used primarily for increased mechanical strength.

Low Temperature Optical Fiber

The primary design requirement of the low temperature fiber 16 is low optical loss over the few to several hundred feet required to transmit the signal to a remote detector. Such low temperature fibers are readily available and known to those skilled in the art.

In accordance with the invention, it is preferrable to use a low temperature fiber 16 with a different diameter than the high temperature optical fiber 14 in order to reproduce coupling losses at the interface between the two fibers. The low temperature fiber 16 can have a diameter either larger or smaller than the high temperature fiber 14.

The low temperature fiber may be cooled during operation to reduce transmission losses. Further, by maintaining a fixed air gap between the high and low temperature fibers, transmission losses from the crystal/air interface can be reproduced within 1%. Losses in the low temperature portion of the high temperature fiber crystal are also negligible. Signal attenuation is less than 1% in 30 cm even in imperfect sapphire crystals 1.25 mm in diameter, grown by the edge-defined growth method and containing varying amounts of optical scattering defects within the crystal and its surface. At temperatures above 1100° C., scattering, absorption, and re-emission at internal defects and impurities and surface imperfections are potential problems, and high quality crystals must be used. At present, selected flame polished fibers are of sufficient quality that, in tests from 1100° to 1700° C. in gas turbine combustor exhaust gases at 0.27 to 0.47 Mach (240-345 m/sec), the total scattered, absorbed and re-emitted radiant intensity measured in a 1.25 mm diameter, 5 cm long uncoated fiber was less than 2% of the radiance from an identical fiber with the blackbody sputtered on its end. No evidence of fundamental lattice absorption has been observed and therefore it can be anticipated that with superior crystals, the amount of scattering and absorption will be further reduced. The majority of the scattering appeared to be due to surface imperfections. Exposure of the fibers to a hot gas stream for several hours at these temperatures has not caused significant surface degradation. However, it can be anticipated that, as the melting temperature of sapphire (2050° C.) is approached, the surface topography will change due to surface diffusion or contamination and the practical maximum temperature and lifetime of the device will depend on the response of the surface to the environment. The lifetime can be improved through designs that limit the length of fiber exposed to the high temperature environment and protect the fiber from direct impact damage or contamination.

There are two features of the temperature device which are distinct improvements over existing devices. First, the sensitivity is quite high. For example, using a silicon detector and amplifier with a $10^5/1$ dynamic range and a 0.2 $\mu$V equivalent input noise within a 0–1 kHz bandwidth, a $10^{-3}$° C. change can be measured at 1000° C. with a signal-to-noise ratio of 10/1. Because of the small thermal mass of the optical fiber tip, only a $10^{-8}$ cal heat input is required to change the temperature of the cavity by $10^{-3}$° C. Second, the useful frequency bandwidth is much larger than comparable metallic thermocouples. The increased bandwidth is due to an improved thermal response of the fiber as well as the high signal-to-noise ratio. In the optical fiber thermometer, the thermal waves are attenuated at the surface, the high frequency gain decreases only 3 db per octave, and a two- to eightfold increase in the transfer function is obtained. The high signal-to-noise ratio permits small cavity temperature oscillations to be detected and further increases the bandwidth relative to that obtained with a fine wire thermocouple. The actual practical bandwidth is determined by the temperature fluctuation power spectral density functions and the spatial resolution considerations of a specific application. As an example, in a gas turbine combustor, the optical fiber thermometer will provide useful information in a 0-100 kHz bandwidth, which is 100-fold improvement over present fine wire thermocouple techniques.

Experiments

Initial experiments were conducted from 700° C. to 1000° C. in a commercial blackbody furnace. The furnace temperature was measured with a calibrated thermocouple. Experiments were conducted with uncoated and coated 1.25 mm, 30 cm long sapphire fibers. The uncoated fiber was inserted directly into the blackbody furnace to evaluate furnace calibration, transmission and photometric errors. In a separate test, a 10 $\mu$m thick platinum tip with an L/D ratio of 2/1 was sputtered on the other fiber and this fiber was inserted to the end of the conical blackbody cavity. The sapphire fibers were coupled across a fixed air gap to a 0.6 mm diameter, 10 meter long, low temperature glass optical fiber. The detector system consisted of a lens, neutral filters with optical densities of 0.3 to 2.0, beam splitters, 0.1 $\mu$m wide filters centered at 0.6 $\mu$m and 0.7 $\mu$m, and two photomultipliers. The photomultiplier output current was measured across a 50 k$\Omega$ resistor with a voltmeter.

The data are presented in the following Table I. In Table I, $\lambda_{eff}$ is defined by the convolution integral of the narrow band filter transfer function and the spectral radiance computed from equation 1, and the relative theoretical value of the flux at this wavelength is computed from equation 1. For this demonstration, the 850° C. measurement was used as the calibration point. Inspection of the data shows that over a 300/1 range of radiance, the uncoated fiber data display standard deviations of 0.054% and 0.048% from the values expected from equation 1, while the coated fiber data display standard deviations of 0.050% and 0.072%. The similarity of the standard deviations of the uncoated and coated fiber data shows that the errors are primarily due to the furnace calibration or photometric errors rather than errors in the radiance from the tip of the sapphire fiber and transmission through the fibers. However, even this simple test demonstrates that unusual accuracy can easily be obtained with an elementary device.

TABLE I

INITIAL TEST DATA
Pt FILM L/D = 2/1; 1.25 mm × 30 cm CRYSTAL

| FURNACE TEMPERATURE, K. | $\lambda_{EFF}$, $\mu$m | FLUX RATIO, L/L$_{CAL}$ THEOR | EXP | APPARENT (OR MEASURED) OPTICAL FIBER TEMPERATURE, K. | % ERROR FLUX, L | TEMPERATURE |
|---|---|---|---|---|---|---|
| UNCOATED FIBER | | | | | | |
| 973.70 | 0.6075 | 0.0400 | 0.0399 | 973.63 | 0.13 | 0.007 |
| | 0.7050 | 0.0622 | 0.0632 | 974.42 | 1.61 | 0.074 |
| 1023.1 | 0.6072 | 0.1286 | 0.1274 | 1022.77 | 0.92 | 0.039 |
| | 0.7047 | 0.1700 | 0.1717 | 1023.60 | 1.00 | 0.049 |
| 1073.6 | 0.6069 | 0.3782 | 0.3697 | 1072.48 | 2.20 | 0.100 |
| | 0.7044 | 0.4321 | 0.4294 | 1073.24 | 0.62 | 0.034 |
| 1123.6 | 0.6065 | — | — | CAL | — | — |
| | 0.7040 | — | — | CAL | — | — |
| 1174.4 | 0.6062 | 2.474 | 2.510 | 1175.24 | 1.52 | 0.072 |
| | 0.7037 | 2.185 | 2.211 | 1175.20 | 1.19 | 0.068 |
| 1225.7 | 0.6058 | 5.709 | 5.739 | 1226.03 | 0.53 | 0.027 |
| | 0.7033 | 4.500 | 4.500 | 1255.70 | 0.00 | 0.032 |
| 1276 | 0.6055 | 12.173 | 12.252 | 1275.81 | 0.64 | 0.015 |
| | 0.7030 | 8.644 | 8.620 | 1275.80 | 0.27 | 0.016 |

TABLE I-continued

INITIAL TEST DATA
Pt FILM L/D = 2/1; 1.25 mm × 30 cm CRYSTAL

| FURNACE TEMPERATURE, K. | $\lambda_{EFF}$, μm | FLUX RATIO, $L/L_{CAL}$ | | APPARENT (OR MEASURED) OPTICAL FIBER TEMPERATURE, K. | % ERROR | |
|---|---|---|---|---|---|---|
| | | THEOR | EXP | | FLUX, L | TEMPERATURE |
| | | | | σ0.6 | 1.20 | 0.054 |
| | | | | σ0.7 | 0.95 | 0.048 |
| COATED FIBER | | | | | | |
| 969.79 | 0.6075 | 0.0380 | 0.0386 | 970.46 | 1.58 | 0.069 |
| | 0.7050 | 0.0595 | 0.0604 | 970.54 | 1.51 | 0.077 |
| 1018.9 | 0.6072 | 0.1223 | 0.1224 | 1019.27 | 0.08 | 0.012 |
| | 0.7047 | 0.1600 | 0.1643 | 1019.36 | 0.80 | 0.045 |
| 1070.4 | 0.6069 | 0.3708 | 0.3732 | 1070.75 | 0.65 | 0.033 |
| | 0.7044 | 0.4247 | 0.4235 | 1070.28 | 0.28 | 0.011 |
| 1121.2 | 0.6065 | — | — | CAL | — | — |
| | 0.7040 | — | — | CAL | — | — |
| 1171.1 | 0.6062 | 2.448 | 2.493 | 1172.23 | 1.84 | 0.096 |
| | 0.7037 | 2.166 | 2.174 | 1171.45 | 0.38 | 0.030 |
| 1223.6 | 0.6058 | 5.785 | 5.788 | 1223.71 | 0.04 | 0.009 |
| | 0.7033 | 4.549 | 4.548 | 1223.66 | 0.03 | 0.005 |
| 1275.2 | 0.6055 | 12.590 | 12.612 | 1275.33 | 0.02 | 0.010 |
| | 0.7030 | 8.898 | 8.686 | 1273.30 | 2.35 | 0.149 |
| | | | | σ0.6 | 1.02 | 0.050 |
| | | | | σ0.7 | 1.20 | 0.072 |

Figure 3:
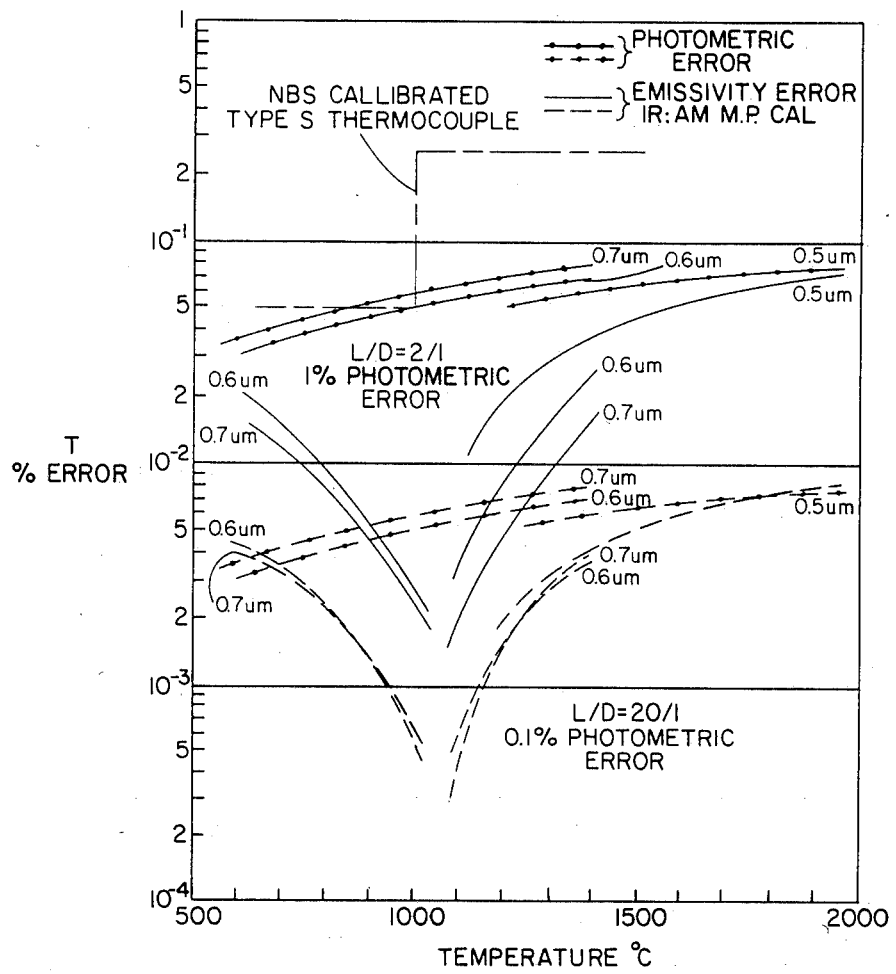
FIG. 3 is a chart showing an analysis of the major errors of an optical fiber thermometer temperature measurement.

The blackbody cavity configuration is used to obtain an apparent emissivity that is constant over the operating range of the thermometer. The theoretical errors encountered in thermometers using L/D ratios of 2 and 20 and several wavelengths are presented in FIG. 3 where it is observed that photometric accuracy is a relative accuracy for an interpolative device which has an L/D ratio of 2 and can be calibrated at a single known temperature in a melting point furnace or a calibrated large blackbody furnace. The device is seen to be approximately four times more accurate than an NBS calibrated ANSI Type S thermocouple standard above 1000° C. The 0.1% photometric errors and radiance errors due to the apparent emissivity of a cavity with a 20/1 L/D ratio are those for a laboratory standard thermometer.

The description of the invention is intended primarily as exemplary to enable those skilled in the art to practice of the invention and it should therefore be understood that, within the scope of the appended claims, the invention may be practiced in other ways than as specifically described.

What is claimed is:

1. A temperature measuring device comprising:
   (a) an elongated high temperature optical fiber,
   (b) one end of said high temperature fiber having an optically dense film covering the outer surface thereof, thereby defining a region of the covered end of said fiber exhibiting blackbody radiation behavior, said blackbody region and said high temperature fiber able to measure temperatures in the range of 500°-2400° C., said blackbody region having a length to diameter ratio in the range 1/1 to 20/1,
   (c) said blackbody region emitting radiation primarily in the range of 0.3 μm-1.0 μm within said temperature range of 500°-2400° C.,
   (d) said high temperature fiber having a diameter in the range of 0.025 mm to 2.5 mm and transmitting radiation in said temperature range without substantial absorption thereof,
   (e) a low temperature fiber having a different diameter than said high temperature fiber and coupled to the other end of said high temperature fiber,
   (f) a light detector coupled to receive light transmitted by said low temperature fiber and including a narrow-band filter for selecting a narrow optical band wherein relatively small changes in temperature within said band result in relatively large changes in intensity emitted by said blackbody region, said narrow optical band within said 0.3 μm-1.0 μm range, said light detector providing an output signal proportional to the intensity of said received light, and
   (g) means responsive to said output signal for providing an indication of said temperature measurement.

2. A temperature measuring device as recited in claim 1 wherein said blackbody region has a surface inclined in the range of 20°-70° from the longitudinal axis of said high temperature fiber.

3. A temperature measuring device as recited in claim 1 further comprising a protective layer overlaying said optically dense film.

4. A temperature measuring device as recited in claim 1 wherein said film comprises a noble metal.

5. A temperature measuring device as recited in claim 4 wherein said noble metal is selected from the group of platinum and iridium.

6. A temperature measuring device as recited in claim 5 wherein said high temperature fiber is a sapphire fiber and said device further comprises an alumina protective film overlaying said optically dense film.

7. A temperature measuring device as recited in claim 6 wherein said optically dense film has a thickness on the order of 0.2 μm-10 μm.

8. A temperature measuring device as recited in claim 5 wherein said high temperature fiber is a zirconia fiber and said device further comprises a zirconia protective film overlaying said optically dense film.

9. A temperature measuring device as recited in claim 8 wherein said optically dense film has a thickness on the order of 0.2 μm-10 μm.

10. A temperature measuring device as recited in claim 1 wherein said optically dense film comprises a chemically doped metallic oxide film.

11. A temperature measuring device as recited in claim 10 wherein said chemically doped metallic oxide film is chromium doped single crystal aluminum oxide.

12. A temperature measuring device as recited in claim 1 wherein said low temperature fiber is coupled to said high temperature fiber via an air gap.

13. A temperature measuring device comprising:
(a) an elongated high temperature optical fiber,
(b) a blackbody region positioned at one end of said high temperature fiber and comprising an optically dense solid oxide material, said blackbody region and said high temperature fiber able to measure temperatures in the range of 500°–2400° C. said blackbody region having a length to diameter ratio in the range 1/1 to 20/1,
(c) said blackbody region emitting radation primarily in the range of 0.3 $\mu$m–1.0 $\mu$m within said temperature range of 500°–2400° C.,
(d) said high temperature fiber having a diameter in the range of 0.025 mm to 2.5 mm and transmitting radiation in said temperature range without substantial absorption thereof,
(e) a low temperature fiber having a different diameter than said high temperature fiber and coupled to the other end of said high temperature fiber,
(f) a light detector coupled to receive light transmitted by said low temperature fiber and including a narrow-band filter for selecting a narrow optical band wherein relatively small changes in temperature within said band result in relatively large changes in intensity emitted by said black-body region, said narrow optical band within said 0.3 $\mu$m–1.0 $\mu$m range, said light detector providing an output signal proportional to the intensity of said received light, and
(g) means responsive to said output signal for providing an indication of said temperature measurement.

14. A temperature measuring device as recited in claim 13 wherein said solid oxide material is aluminum oxide doped with chromium.

15. A temperature measuring device as recited in claim 14 wherein said chromium is doped in the amount between 0.1–20% by weight.

16. A temperature measuring device as recited in claim 14 wherein said high temperature fiber is a sapphire fiber and said device further comprises an alumina protective film overlaying said optically dense aluminum oxide doped with chromium.

17. A temperature measuring device as recited in claim 14 wherein said high temperature fiber is a zirconia fiber and said device further comprises a zirconia protective film overlaying said optically dense aluminum oxide doped with chromium.

* * * * *